Patented Aug. 5, 1924.

1,503,751

UNITED STATES PATENT OFFICE.

CARL DREYMANN, OF BALTIMORE, MARYLAND.

METHOD OF EXTRACTING OIL.

No Drawing.　　　Application filed July 9, 1920. Serial No. 395,036.

*To all whom it may concern:*

Be it known that I, CARL DREYMANN, a citizen of Germany (who has filed first and second U. S. citizenship papers), residing at Baltimore, in the county of Baltimore City, State of Maryland, have invented certain new and useful Improvements in Methods of Extracting Oil; and I do hereby declare the following to be a full, clear, and exact description of the invention, such as will enable others skilled in the art to which it appertains to make and use the same.

This invention relates to improvements in the extraction of oils and fats from oil-containing or fat-containing materials with the aid of a solvent. The invention is of particular advantage in the extraction of materials containing water in greater or less amount, such as bones, tankage, garbage, oil seeds, etc.

During the extraction of such oil-containing materials, by means of a solvent, the water is separated to a greater or less extent during the extraction and is drawn off in admixture with the solvent. This water contains soluble organic material dissolved in it, and, when the solvent is evaporated, or is used repeatedly for the extraction, this dissolved organic material causes discoloration of the fat.

According to the present invention, this objectionable discoloration of the fat is avoided or reduced to a minimum. This is effected by removing the solvent from the extraction apparatus, together with admixed water, separating the water from the solvent, and returning the water-free solvent to the extraction apparatus, thereby keeping the solvent in continuous circulation and preventing any prolonged contact of the contaminated water with it. The resulting solution of the oil or fat in the solvent is thus obtained in a substantially water-free state, and the solvent is then evaporated to give the fat or oil which is thus obtained without objectionable contamination or discoloration and of a lighter color and more agreeable odor.

In the practice of the invention, the oil-containing or fat-containing material may be charged into a suitable extracting vessel or tower and the solvent introduced continuously at the top of the apparatus and permitted to percolate down through the material, thereby extracting the oil or fat. The resulting solution of oil or fat in the solvent collects in the bottom of the apparatus, together with the water which is separated from the material at the same time and which contains nitrogenous organic matter dissolved therein. Instead of recirculating the entire amount of solvent and admixed water for effecting further extraction, and thereby keeping the contaminated water in prolonged contact with the solution of fat and permitting the nitrogenous matter in solution to be absorbed by and contaminate and discolor the fat, the water and solution are drawn off from the bottom of the apparatus and the water is separated from the solution. This separation can be effected in a suitable separator, in which the water is automatically separated, and the water-free solvent, with the oil or fat dissolved therein, is returned to the top of the extractor to effect further extraction therewith. This extraction and separation can be carried out in a continuous manner by pumping the solvent and admixed water from the lower part of the extractor into a separator and pumping the water-free solvent from the separator back to the top of the extractor, thereby keeping the solvent in continuous circulation and freeing it from water without permitting prolonged contact of the contaminated water therewith.

The improved process of the present invention can be carried out in different types of apparatus, as will be readily understood. Apparatus of the character above referred to, that is, an extraction apparatus arranged so that the solvent can be introduced at the top and caused to flow down through the body of material to be extracted, with resulting collection of the solvent and admixed water at the bottom, is well adapted for use in the practice of the invention.

The solvent can be repeatedly recirculated through the apparatus and its fat content gradually increased, the water being separated therefrom during each recirculation. So also, the extraction can be carried out on the counter-current principle by subjecting successive bodies of material to extraction with the same solvent, and separating the admixed water from the solvent before it is passed from one body of material to the next. The solvent can thus be progressively increased in its fat content while the material itself is progressively extracted, the fresh solvent being used to complete the extraction of the partially extracted material.

The extraction can be carried out with different oil or fat solvents, such as are commonly used for fat extraction purposes, but they should not be miscible to any great extent with water, so that the admixed water can be separated therefrom without difficulty. Petroleum hydrocarbons of suitable boiling point can thus be used for the extraction. The extraction can be carried out at ordinary temperatures, or the solvent action can be increased by proper heating.

When a solution of the oil or fat in the solvent is obtained in the manner described, with a sufficient oil or fat content, the water-free solution is subjected to evaporation for the separation of the solvent from the oil or fat. Owing to the substantial absence of contaminated water in admixture with the solvent, both during the extraction and the subsequent evaporation, the resulting oil or fat is light in color and of more agreeable odor for the reason that it contains less contaminating organic impurities dissolved therein. The advantages of the invention are especially marked in the extraction of materials such as old bones, garbage, fish offal, and other low grade materials, which contain appreciable amounts of readily soluble nitrogenous organic matter and appreciable amounts of water which may be saturated with such soluble material. By carrying out the extraction according to the present invention, these soluble impurities contained in the water are prevented from having any continued contaminating or objectionable action upon the fat being extracted.

I claim:

1. The method of extracting oils and fats from materials containing them and also containing water, which comprises subjecting such materials to extraction with a solvent of the oil or fat, withdrawing the resulting fat solution and admixed water, separating the water from the solution of the oil or fat in the solvent, and returning the resulting water-free solution for further extraction.

2. The method of extracting oils and fats from materials containing them and also containing water, which comprises subjecting such materials to extraction with a suitable solvent of the oil or fat, continuously separating water from the resulting solvent solution during extraction, and evaporating the solvent from the water-free solution.

3. The method of extracting oils and fats from materials containing them and also containing water, which comprises subjecting such materials to repeated extraction with a suitable solvent of the oil or fat, withdrawing the solvent after each extraction and separating the water therefrom, and returning the water-free solvent for further extraction.

4. The method of extracting oils and fats from materials containing them and also containing water, which comprises subjecting the body of such material to extraction with a suitable solvent of oil or fat, withdrawing the resulting solution and admixed water, separating the water from the solution, returning the solution for further extraction and repeating the extraction and separation of water until a solution of high fat content is obtained, and evaporating the solvent from the extracted fat.

In testimony whereof I affix my signature.

CARL DREYMANN.